United States Patent [19]

Sinclair et al.

[11] 4,263,032

[45] Apr. 21, 1981

[54] METHOD OF MAKING OPTICAL FIBERS UTILIZING THERMOPHORETIC DEPOSITION OF GLASS PRECURSOR PARTICULATES

[75] Inventors: William R. Sinclair; Willy W. van Roosbroeck, both of Summit, N.J.

[73] Assignee: Bell Telephone Laboratories, Incorporated, Murray Hill, N.J.

[21] Appl. No.: 80,483

[22] Filed: Oct. 1, 1979

Related U.S. Application Data

[63] Continuation of Ser. No. 934,816, Aug. 18, 1978, abandoned.

[51] Int. Cl.³ .................. C03C 25/02; C03B 37/02
[52] U.S. Cl. .................................. 65/3 A; 65/13; 427/163
[58] Field of Search .............. 65/2, 3 A, 4 B, 13; 427/163, 167; 264/1

[56] References Cited

U.S. PATENT DOCUMENTS

| Re. 28,029 | 6/1974 | Keck et al. | 65/3 A |
|---|---|---|---|
| 3,980,459 | 9/1976 | Li | 65/3 A X |
| 3,982,916 | 9/1976 | Miller | 65/3 A |
| 4,009,014 | 2/1977 | Black et al. | 65/3 A |

OTHER PUBLICATIONS

Bell Systems Technical Journal (1937), vol. 30, pp. 271, 278.
Particulate Clouds, Smokes & Mists (1964), H. L. Green et al.

Primary Examiner—Robert L. Lindsay, Jr.
Attorney, Agent, or Firm—Samuel H. Dworetsky; Peter V. D. Wilde

[57] ABSTRACT

The deposition of glass precursor particulates, during optical fiber fabrication, is rendered more efficient by increasing the thermal forces which play a significant role in directing the particulate material to an appropriate substrate. Specific embodiments are addressed to various optical fiber fabrication processes, all of which involve the formation of glass particulate material and its subsequent deposition on an appropriate substrate.

22 Claims, 8 Drawing Figures

METHOD OF MAKING OPTICAL FIBERS UTILIZING THERMOPHORETIC DEPOSITION OF GLASS PRECURSOR PARTICULATES

This application is a continuation of Ser. No. 934,816, filed Aug. 18, 1978, now abandoned.

TECHNICAL FIELD

This invention involves the fabrication of optical fibers.

BACKGROUND OF THE INVENTION

The realization during the past decade that optical fibers may play a significant and commercially viable role in communication systems—both because of their increased information carrying capacity and their decreased size—has led to a dramatic increase in research and development into various fiber structures, as well as into more efficient and cost effective fabrication processes.

There are currently two major processes which dominate the fiber fabrication field. The first, disclosed in part U.S. Pat. No. Re. 28,029, generally involves the formation of glass particulate material by flame hydrolysis and its subsequent deposition on a solid glass rod. After an appropriate thickness of glass particulate material has been deposited on the rod, the rod may be removed, and the material is consolidated into a transparent glass by heating in an appropriate environment. The resultant tubular "optical fiber preform" is then drawn into a fiber, preceded by or simultaneous with, collapse of the tubular preform. The glass precursor particulate material used in this process is generally formed from volatilized glass precursor liquids (e.g., silicon tetrachloride, germanium tetrachloride and boron trichloride) using a hydrolysis burner. In view of the fact that this particulate material is formed in a flame, it is commonly referred to as "soot"—to be distinguished from glass precursor particulate material formed using other processes and without the use of a hydrolysis flame burner.

The second prevalent fiber fabrication process—the Modified Chemical Vapor Deposition process (MCVD)—involves the reaction of appropriate vapor species located within a glass tube, to produce glass precursor particulate material (see U.S. patent application Ser. No. 828,617, filed Aug. 29, 1977, a continuation of application Ser. No. 444,705, filed Feb. 22, 1974. The glass precursor vapors are flowed through the tube while the tube is heated with an appropriate heat source. The particulate material formed in this reaction subsequently deposits on the interior of the glass tube. After a sufficient deposit has formed, the glass tube is collapsed and drawn into a fiber. The deposited particulate material comprises the core, and in certain embodiments the cladding, of the optical fiber, while the tubular starting member generally comprises an appropriate jacket.

The MCVD technique may be traced historically to the prevalent semiconductor technology. This technology requires the formation of ultrapure silicon oxide layers. It was found that such layers may be efficiently grown by heating an appropriate substrate in a gaseous environment of silicon-containing-vapor and oxygen. Silicon oxide was found to deposit heterogeneously on the surface without the formation of a particulate phase. In fact, the formation of such a particulate phase was in many circumstances deleterious and was specifically avoided.

In a significant departure from this prior art semiconductor teaching, the MCVD fiber fabrication process involves the formation of silicon oxide by means of an intermediate particulate phase. Such a particulate phase is found to result in significantly increased deposition rates without sacrificing the required purity of the deposited material.

The MCVD process must be distinguished from the previously discussed hydrolysis process in which the particulate material is formed in a flame—and consequently referred to as "soot." The soot process has its historical roots in previous hydrolysis technology. Unlike the users of MCVD, the practitioner of the soot process must consider the significant impurity problems primarily due to the formation of water vapor—a strong absorber of light in the spectral range of interest—during the hydrolysis reaction.

The modified chemical deposition process has met with great success. However, it presents an apparently academic question of interest to basic researchers in the field—namely, what is the mechanism responsible for the deposition of the particulate material on the tubular wall. Gravitational forces apparently are not adequate to explain this phenomenon. However, in view of the fact that the process works effectively, this question was relegated to the sphere of unanswered academic problems whose solution would have little commercial ramifications.

SUMMARY OF THE INVENTION

This invention is a method for increasing the deposition efficiency of glass particulate material on a substrate during the fabrication of optical fibers. The invention lies partly in the realization that thermal forces may play the most significant role in directing particulate material from their region of formation to the substrate. The invention consequently involves increasing the effect of such thermal forces. According to the teachings of this invention this may be done by increasing the appropriate thermal gradients, providing additional thermal gradients, or effecting any other parametric change which would increase the effect of the thermal forces in guiding the particulate material to the substrate.

DETAILED DESCRIPTION

1. Introduction

Figure 1:
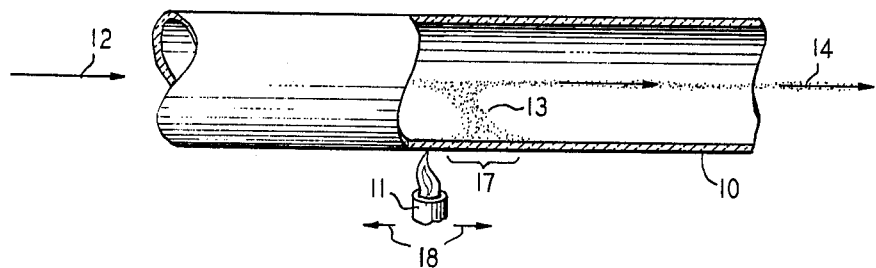
FIG. 1 is a schematic representation of an MCVD apparatus.

The invention, in its most generic form, involves increasing the deposition efficiency of glass precursor particulate material (usually in the range of 0.1–1.0 microns in diameter) during the fiber fabrication process by increasing the effect of the thermophoretic forces which direct the particulate material to the appropriate substrate. The term thermophoretic forces, as used in this specification, denotes the thermal forces acting on a particle as a result of the temperature gradient associated with the surrounding environment. The effect of this temperature gradient on a given particle may be understood by considering the molecular forces impinging on the particle. Those molecules which strike the particle from the high temperature side impart a greater impulse to the particle than those molecules which strike the particle from the low temperature side. In addition, the practitioner skilled in the art will appreciate that concomitant radiation effects may augment these "molecular" forces. As a result of these and similar effects, the particle "feels" a net force directing it from the hotter temperature zone to the cooler temperature zone. This is the "theromophoretic" effect to which this specification has reference. The invention envisions a thermophoretic force sufficiently large to influence the vector velocity of the particulate material formed. According to the teachings of this invention, specific means are used to enhance the thermophoretic forces, over and above the means which are concomitant to the normal deposition process encountered in standard fiber fabrication techniques.

It should be carefully noted that in most fiber fabrication processes thermophoretic forces are involved in the particulate deposition—albeit without the intentional design of the practitioner—to yield particulate deposition. Consequently, applicants are not the first to suggest a deposition configuration involving thermophoretic forces. However, they are the first to appreciate the presence of such forces and their importance in particulate deposition during fiber fabrication. As a result of this appreciation they have been able to suggest new configurations and specific manipulative steps which intentionally enhance the thermophoretic forces, and which consequently improve deposition efficiency, thereby significantly advancing the art of fiber fabrication. Enhancement of the thermophoretic forces may proceed, for example, by increasing the appropriate temperature gradients so as to maximize the thermophoretic forces tending to direct the particulate material to the appropriate substrate. The invention, as properly construed, encompasses the use of any means to enhance this thermophoretic effect.

Apparently, workers in other fields have been aware of the effect of thermal forces on the transport of particulate material from one region to another. For example, such forces were used to thermo-repulse particulates from a substrate during the production of soot-free carbon films on ceramic surfaces by pyrolysis of a hydrocarbon vapor at about 1000 degrees. A soot-free zone about two millimeters thick could be maintained adjacent to the ceramic surfaces if the surfaces were kept hotter than the ambient vapor. A pronounced soot concentration could be observed at the boundary of the soot-free zone in the vapor (W. W. van Roosbroeck, *Bell System Technical Journal,* Vol. 30, p. 271, 1937, at page 278).

Similar behavior obtains with ambient gas at room temperature. For example, the dust-free zone surrounding a hot body was discussed by Tindall in 1870 and further elaborated on by Aitken in 1884 (see for example discussion in (1) H. L. Green and W. R. Lane, *Particulate Clouds: Dusts, Smokes and Mists* (D. Van Nostrand Co., Princeton, New Jersey, 1964); (2) H. H. Watson, *Disperse Systems in Gases; Dust, Smoke and Fog,* (Gurney and Jackson, London, 1936); (3) I. Langmuir, *Phys. Rev.,* Vol. 34, p. 401 (1912)). A thermal precipitator dust sampling apparatus, in which the dust containing gas is drawn across a hot wire through a channel whose walls are less than about a convection-free conduction zone from the wire, has been found to give a collection efficiency of nearly 100 percent (H. L. Green and H. H. Fadon, Medical Research Council Special Report, Series No. 199).

Despite this prior art, no one, to applicants' knowledge, has suggested the possible use of enhanced thermophoretic forces to increase the deposition efficiency of glass precursor particulate material in the formation of optical fiber preforms. Quite to the contrary, the prior teaching in the fiber fabrication art indicates that the substrate must be heated—yielding a thermal gradient that tends to diminish particulate deposition. For example, in the soot process, the hydrolysis burner effectively heats the rod substrate upon which the particulate material is to be deposited. Similarly, in the MCVD process, the tube through which the glass precursor vapors are flowed is heated, usually with a flame, to yield the requisite particulate forming reactions. This heating, however, in both the soot and MCVD process, raises the temperature of the substrate upon which the particulates are deposited, yielding a thermal gradient, which applicants now disclose, is adverse to particulate deposition.

If one traces the history of the MCVD process, to its semiconductor progenitors, one finds that the now deleterious substrate heating step is an absolute requisite to the formation of a silicon oxide layer. However, applicants have now shown that when particulate material is formed, to be subsequently deposited on a substrate, such heating of the substrate hinders the requisite deposition. The use of enhanced thermophoretic forces to improve the deposition, according to the teachings of this invention, in part helps to alleviate this problem. More fundamentally however, applicants' invention has resulted in the complete disassociation of the MCVD process from its progenitors in the semiconductor art. It is now understood that particulate formation in MCVD is, and ought to be considered, a totally separate step from deposition. While heating the tubular starting member is one means to obtain formation of glass precursor particulate material, other particulate formation means may lead to enhanced particle deposition. For example, the particulate material may be formed external to the starting member and subsequently deposited through the use of thermal gradients established solely for deposition purposes and completely disassociated from the particulate formation process.

2. Details of the Process

In view of applicants' enhanced understanding of the thermophoretic forces which come into play during the particulate deposition which occurs in fiber fabrication, heretofore unexplained effects can now be understood. For example, FIG. 1 shows a typical MCVD fabrication apparatus. In this FIG., 10 is the tubular starting member, 11 is an appropriate heating source such as a flame with appropriate traversal means 18, 12 is a stream of glass precursor vapors, 13 is the glass particulate material being deposited, and 14 is the undeposited glass particulate material which exits the tubular starting member. It should be observed that the particulate deposition was known to occur not in the region of the heat source which is used to heat the tube, but rather downstream from this heat source, at 17. Serious attempts to understand this behavior were never made, since such understanding was apparently not necessary for the successful practice of the MCVD process. Applicants' enhanced understanding of the role of thermophoresis in the deposition process allows for the explanation of this effect, as well as for the suggestion of techniques for further enhancing the deposition efficiency.

The explanation of the downstream deposition phenomenon lies in the fact that in the region of the flame, the tubular wall is as hot as, or hotter than, the particulate stream at its point of formation. Consequently, the thermophoretic forces may point away from the wall and prevent deposition. It is only downstream of the heat source, where the wall cools off and its temperature becomes less than the temperature of the particulate stream, that the direction of the thermophoretic forces reverses and guides the particulate material from the center region of the tube to the wall upon which it deposits.

Clearly, increasing the effect of the thermophoretic forces by, for example, increasing the temperature gradient, will yield even more efficient collection of the particulates which are formed in the heated zone. For example, with further reference to FIG. 1, it has been observed that significant amounts of particulate material, 14, exit the tube without ever being deposited. The reason for this was not previously understood and the loss was accepted as a necessary cost that must be paid for other improvements inherent in the MCVD process. With applicants' increased understanding, it may now be shown that the loss of the undeposited particulate material, 14, can be directly associated with the lack of sufficient thermal forces necessary to direct these particulates to the tubular wall. Those particulates formed with low longitudinal velocities can be captured within the tube's length. However, those particulates that are formed with high axial velocities exit the tube before the thermophoretic forces can direct them to the tubular wall. If the thermophoretic forces are increased, these more rapid particulates would also be captured.

Figure 2:
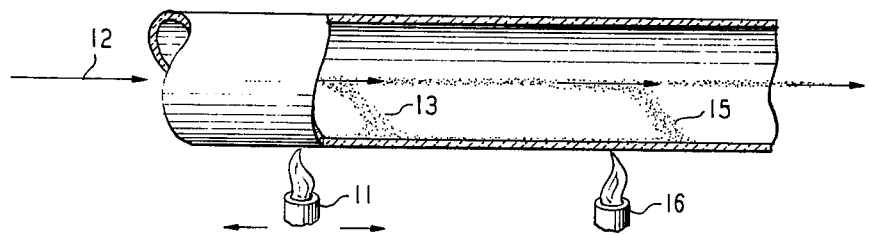
FIG. 2 is a schematic representation of an MCVD apparatus including an additional heat source, used according to the teachings of this invention to enhance the particulate deposition.

FIG. 2 is a schematic representation of an MCVD apparatus similar to FIG. 1 in which applicants have increased the thermophoretic force and have obtained an increase in deposition efficiency and a concomitant decrease in lost particulate material. In this FIG. an additional heat source 16 is shown downstream of the first heat source. The parameters associated with the heat sources and the flow rates of the reactant vapors are such that the second heat source produces no new particulate material. Nevertheless, as shown in FIG. 2 the effect of the second heat source is to reheat the particulate stream, resulting in additional thermophoretic forces where the wall has cooled downstream from this second heat source, and hence additional deposition, 15, beyond the second heat source, and less loss of particulate material.

While this specification contains a number of suggestions to increase the thermophoretic forces and thereby improve particulate deposition efficiency during fiber formation, other improvements in the fabrication process may be effected once the increased thermophoretic force is present. For example, increased thermophoretic forces allow for more rapid introduction of glass precursor vapors, and consequently more rapid production of particulate material, in light of the fact that the enhanced thermophoretic forces result in effective deposition of the rapid particulates additionally formed. These additionally produced particulates are then effectively deposited on the tubular wall. However, it must be borne in mind that the velocity of the glass precursor vapors which is introduced into the tube may be limited. This limitation can be understood by considering that the larger axial velocities result in a larger deposition region shown in FIG. 1 as 17. If the deposition region is too large and if it cannot be sufficiently narrowed by additional thermophoretic forces, then nonuniform deposition will occur at the ends of the tube.

A further potential deleterious effect of increased axial velocities involves the effect that this increased velocity will have on the heating of the particulate material formed. For example, if the particles pass rapidly through the hot zone, their temperature will be lower than if they pass more slowly through the hot zone, and have an opportunity to equilibriate. If the particulates do not reach a sufficiently high temperature, the resultant thermophoretic force, which is directly related to the difference between the temperature of the particulates and that of the wall, will be too low to effect efficient deposition. In the event of such elevated velocities, a broader heat zone may be used to give the particulate material sufficient time to equilibriate.

The dependence of the deposition efficiency on the axial velocity of the particulate material, as well as on the thermophoretic forces, yields an interesting selection mechanism. It should be noted that the particles with slower axial velocities are more likely to deposit than those with more rapid axial velocities. Hence, by carefully tailoring the thermophoretic forces, one might capture only those particles with velocities less than a preselected value. Since the axial velocity of the particles will be at least partially dependent on various chemical parameters associated with the reaction in the heated zone, it may be possible through this mechanism to select those particles with identifiable compositional, chemical, or physical characteristics determined by the limited range of reaction parameters inherently chosen through this selection mechanism.

An additional example of the enhanced understanding of previous processes that is now possible, may be shown by applicants' explanation of the unusually high efficiency observed when an appropriate rf coil is used as the heat source to stimulate an rf plasma within the tubular starting member. In view of the much higher temperatures which are obtained with this heat source, it is clear that much higher temperature gradients are obtained between the produced particulates and the cooled wall downstream of the heat source. This higher temperature gradient will yield higher thermophoretic forces and much more efficient collection of the produced particulates as observed.

3. Specific Embodiments

In addition to the embodiments discussed in presenting the general nature of the thermophoretic effect, the following specific embodiments are suggested alternative techniques for enhancing the thermophoretic force in the fiber fabrication process.

FIG. 3

Figure 3:
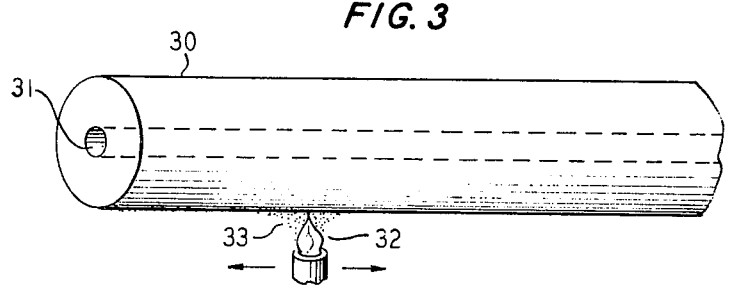
FIG. 3 is a schematic representation of a "soot" apparatus with additional means, used accoarding to the teachings of this invention, to enhance the particulate deposition.

FIG. 3 depicts deposition of particulate material using the hydrolysis burner technique. The solid cylindrical substrate 30 upon which the particulates 33 are deposited has a central bore region 31 through which a cooling medium is passed, thereby increasing the temperature gradient between the flame 33 in which the particulates are formed and the substrate 32 upon which they are deposited.

FIG. 4

Figure 4:
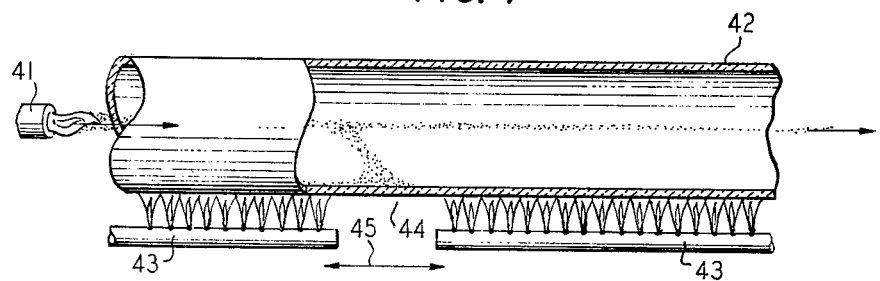
FIGS. 4–8 are alternative embodiments of this invention.

In FIG. 4 a hydrolysis burner, or any other appropriate particulate source, 41 is used to deposit particulate material on the inside walls of a tubular starting member 42. Heretofore a problem with this configuration has been the lack of uniformity of the deposited particulate material. Using the teachings of this invention, a broad flame 43 with a cooling region 44 traverses the tube using traversal means 45. Two benefits inure from this configuration. Firstly, the particulates deposit only in a predetermined region, namely, the cooling region 44. This is the only region in which the thermophoretic forces point towards the tubular substrate. By using the traversal means, this deposition region can be made to traverse the entire tube. A second benefit associated with this configuration involves the use of the broad flame which acts as an essentially continuous consolidation heat source, thereby resulting in effective consolidation of the deposited particulates. The cool region 44 may result merely from the absence of a flame, or from specific cooling means. While 41 is shown as a hydrolysis burner it may be any source of appropriate particulate material.

FIG. 5

Figure 5:
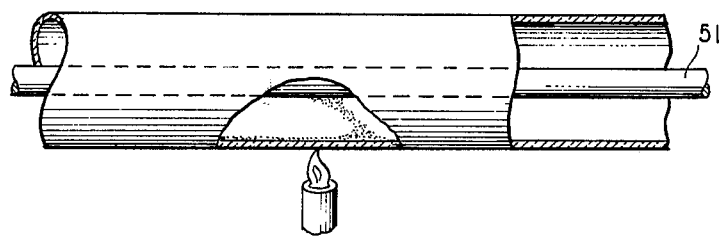

FIG. 5 is a schematic representation of an MCVD deposition apparatus. In this configuration the thermophoretic temperature gradient downstream of the flame is increased by utilizing a heated core region shown as 51. This heated region may be, for instance, a heated refractory rod. The presence of this rod yields larger temperature gradients, pointing toward the tubular substrate, thereby resulting in more efficient particulate deposition. While the representation shows a typical MCVD configuration, the heated central region may be used in conjunction with the configuration of FIG. 4 as well. In addition the heated rod need not extend through the length of the tube but may rather be placed over a limited region where deposition is required.

FIG. 6

Figure 6:
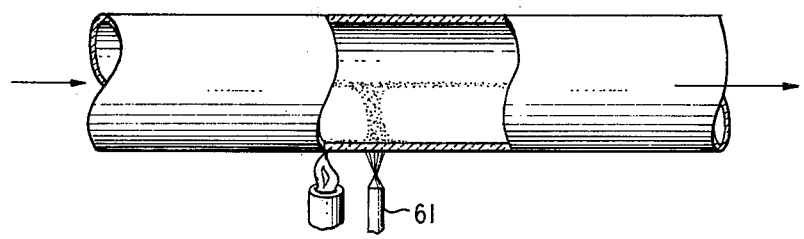

FIG. 6 is a schematic representation of a standard MCVD configuration with an additional cooling means 61 to enhance the temperature gradient between the particulates and the substrate.

FIG. 7

Figure 7:
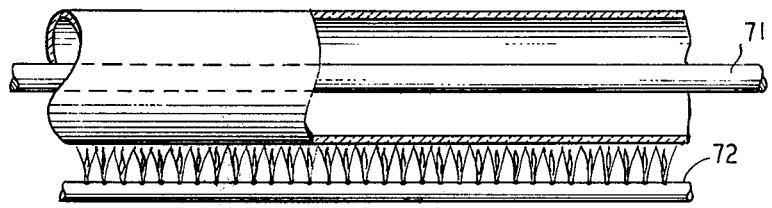

As discussed above, additional benefits may accrue from being able to consolidate continuously the deposited particulate material. FIG. 7 is a configuration which allows for such continuous consolidation through the use of enhanced thermophoretic forces. In this FIG. a central heated region 71 is utilized in conjunction with a region flame 72. The temperature of the central region is significantly greater than that of the broad flame. Consequently, particulate material either formed in the tube or introduced into the tube will deposit upon the inner surface of the tubular starting member because of the favorable temperature gradient. Because of the favorable temperature gradient due to 71, the temperature of the flame 72 may be high enough to result in continuous consolidation of the deposited particulates. In this configuration the central region 71 may itself be the source of glass precursor vapors or particulates which are introduced all along the region 71 so as to yield uniform particulate deposition.

FIG. 8

Figure 8:
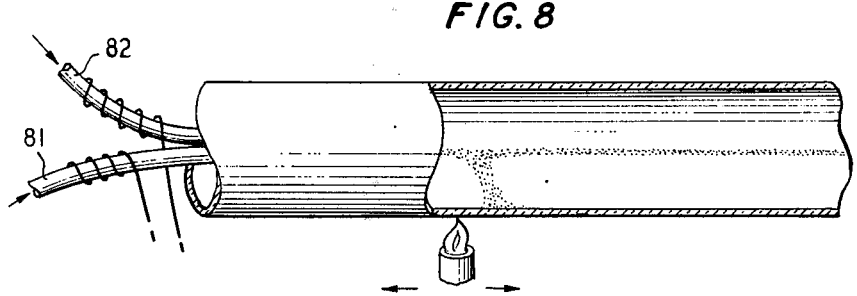

In FIG. 8 the various precursor vapors are introduced into the tubular member of a typical MCVD apparatus by means of heated tubes 81 and 82. Preheating the vapors thusly will elevate the temperature of the particulates upon formation and will consequently yield a higher temperature gradient.

4. Examples

Example 1

In this example, the MCVD process was practiced with an additional burner, as shown in the configuration of FIG. 2. The tubular starting member was a fused quartz 16/18 mm. tube. The tube was chucked in a glass lathe and reactants ($SiCl_4$, $GeCl_4$, $PoCl_3$, $O_2$) were passed through the tube at a total flow rate of 1600 ml/min, typical for MCVD. An oxyhydrogen torch was placed near the inlet end of the tube and used to produce a section of approximately 2 centimeters in length, heated to approximately 1400 degrees C., as the tube was rotated by the lathe. A particulate deposit was observed downstream from the burner with a decreasing powder density for a distance of approximately 20 centimeters. Beyond this there was no obvious accumulation.

A second torch was positioned several centimeters beyond the termination of the original deposit while the reactants continued to flow and while the upstream oxyhydrogen torch maintained the temperature of the upstream heated region at 1400 degrees C. A second band of deposit was observed to form a few centimeters beyond the section heated by the second torch. Kinetic studies indicated that with these parameters, reaction of the constituents is complete after the gas stream passes the first heated zone, and that only oxidic particles, together with $Cl_2$ and $O_2$ gas, reach the second zone. The further deposition of particulate material downstream of the second torch is indicative of the thermophoretic effect.

Example 2

In this experiment, the effect of both a broad hot zone and a cooling stream were shown. In the experiment, a glass tube was arranged in a configuration similar to that of Example 1 and appropriate precursor vapors were flowed through the tube to yield germanium borosilicate glass. The flow rate of the vapor was approximately 1480 cc/min.

In the first phase of this experiment, a standard burner with a flame approximately 3 centimeters wide was used to heat a section of the tube. The flame traversed the tube at a rate of 25 cm./min. The temperature of the particulate material was measured with an optical pyrometer and found to be approximately 1500 degrees C. The temperature of the tube wall, downstream from the flame, was measured with a thermocouple and found to be approximately 270 degrees C. The deposition rate was measured to be 0.139 grams/min. with an efficiency of 30.4 percent.

In the second phase of this experiment a cooling nitrogen stream was directed to the tube wall downstream from the flame, yielding a wall temperature less than 270 degrees C.—otherwise the previous parameters were unchanged. Under these circumstances the deposition rate increased to 0.184 grams/min. with an increase in efficiency to 40.2 percent, demonstrating the effect of the enhanced thermophoretic forces associated with the increased temperature gradient established by cooling the tube wall.

In the next phase of this experiment the hot zone was broadened to approximately 7 centimeters while the temperature of the particulate material was lowered to approximately 1350 degrees C. Despite this lower temperature the deposition rate increased to a rate of 0.192 grams/min with an increase in efficiency to 42 percent. This improvement, despite the lower particulate temperature, is due to more efficient heating of the particulate material as a result of the broad hot zone, with a concomitant improvement in the thermophoretic forces. This allows lowering the temperature without deleterious effects, or alternatively maintaining the increased temperature and increasing the reactant flow to yield more particulate formation.

We claim:

1. A method of fabricating optical fibers comprising:
    a. forming glass precursor particulate material;
    b. depositing the glass precursor particulate material on an appropriate substrate to yield an optical fiber preform; and
    c. drawing the optical fiber preform into an optical fiber;
    the invention CHARACTERIZED IN THAT
    the particulate material is directed from regions of higher temperature to regions of lower temperature utilizing additional thermophoretic means.

2. The method of claim 1 wherein the additional thermophoretic means comprises a temperature gradient means.

3. The method of claim 2 wherein the additional temperature gradient thermophoretic means does not result substantially in the formation of additional particulate material.

4. The method of claim 3 wherein the substrate is the inside surface of a heated tubular glass starting member, through which appropriate glass precursor vapors are flowed.

5. The method of claim 4 wherein the tubular starting member is heated using at least two external heat sources, the additional thermophoretic means comprising one of the heat sources which is placed downstream of the other, at a point at which there is substantially no deposition.

6. The method of claim 4 wherein the additional thermophoretic means comprises a heated rod situated within the tubular starting member and essentially coaxial with it.

7. The method of claim 6 wherein the additional thermophoretic means further comprises a gas stream which is flowed through the tubular starting member adjacent to the tubular wall so as to further cool the tubular wall.

8. The method of claim 4 wherein the heat source is external to the tube and extends substantially throughout the length of the tubular starting member, and wherein a rod is placed within the tubular starting member, coaxial with it, and heated to a temperature greater than that of the tube wall.

9. The method of claim 8 wherein the heat source is a flame.

10. The method of claim 3 wherein the substrate is a tubular glass starting member and wherein glass precursor particulate material is formed externally to the tube and subsequently introduced into the tube and deposited on the inside wall of the tube.

11. The method claim 10 wherein the tubular member is heated externally over substantially its entire length by an extended heat source having associated with it a limited region of decreased temperature and wherein deposition occurs over the region of decreased temperature.

12. The method of claim 11 wherein the region of decreased temperature is cooled by means of an external cooling source.

13. The method of claim 10 or 11 wherein the glass precursor material is formed externally to the tubular starting member by means of an hydrolysis burner.

14. The method of claim 13 wherein the heat source is a flame.

15. The method of claim 3 wherein the starting member is a glass rod, and wherein the glass particulate material is deposited on the outside of the rod.

16. The method of claim 15 wherein the additional thermophoretic means comprises a cooling means applied to the center region of the rod.

17. The method of claim 16 wherein the cooling means comprises a cooling material which is passed through a bore in the central region of the rod.

18. The method of claim 4 wherein the additional temperature gradient thermophoretic means comprises a cooling means applied to the tube downstream of the heated region.

19. The method of claim 4 wherein the cooling means comprises a gas stream.

20. The method of claim 4 wherein the precursor vapors are introduced into the tube by means of appropriate gas lines and wherein the additional temperature gradient thermophoretic means comprises a heating means applied to the said gas lines.

21. The method of claim 3 wherein the additional thermophoretic temperature gradient means are so selected as to result in the deposition of substantially all particles with an axial velocity less than a preselected value.

22. A method of fabricating optical fibers comprising:
    a. forming glass precursor particulate material;
    b. depositing the glass precursor particulate material on an appropriate substrate to yield an optical fiber preform; and
    c. drawing the optical fiber preform into an optical fiber;
    the invention characterized in that
    the particulate material is directed from regions of higher temperature to regions of lower temperature utilizing additional thermophoretic means thereby directing the glass precursor particulate material to the substrate.

* * * * *